United States Patent Office 2,969,361
Patented Jan. 24, 1961

2,969,361

2,4-SUBSTITUTED-6,7-DIHYDRO-5H-CYCLOPENTA-[d]PYRIMIDINES

Quentin E. Thompson, Belleville, Ill., assignor to Monsanto Chemical Company, St. Louis, Mo., a corporation of Delaware No Drawing. Filed Mar. 6, 1958, Ser. No. 719,493

5 Claims. (Cl. 260—251)

This invention relates to new and useful adiponitrile derivatives and to the process for making the same.

The new compounds of this invention may be represented by the general formula

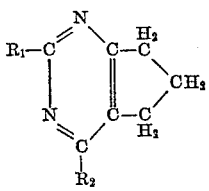

where $R_1$ is a member of the group consisting of an alkyl radical having from 1 to 8 carbon atoms and $NC(CH_2)_4$ and $R_2$ is a member of the group consisting of Cl, OH and $NH_2$. This invention also includes a compound of the above structure wherein $R_1$ is $NC(CH_2)_4$ and $R_2$ is

These new compounds may be more specifically designated as 2,4-substituted-6,7-dihydro-5H-cyclopenta[d]pyrimidines.

As illustrative of the new compounds and the preparation thereof are the following:

EXAMPLE I 6,7-dihydro-4-hydroxy-2-methyl-5H-cyclopenta[d]pyrimidine

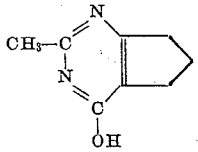

Into 400 ml. of 1.0 molar potassium tert.-butoxide-tert.-butanol solution was dissolved 2-carbethoxycyclopentanone [1] (55.7 g.). Acetamidine hydrochloride (33.7 g.) was added with good stirring. The temperature rose initially to 45° but subsided as a fine precipitate of potassium chloride separated. After stirring at room temperature for 25 hours, the bulk of the solvent was removed in vacuo at about 40–50°. To the thick slurry remaining was added 440 ml. of saturated sodium chloride solution, 440 ml. of chloroform and 7 ml. of glacial acetic acid. The aqueous layer was separated and extracted again with 100 ml. of chloroform. The chloroform layers were combined, washed once with 200 ml. of saturated sodium chloride solution, dried with anhydrous $CaSO_4$, and the solvent removed. The residue of white needles remaining was washed with 200 ml. of ether. The yield of good quality 6,7-dihydro-4-hydroxy-2-methyl-5H-cyclopenta[d]pyrimidine obtained in this way amounted to 33.8 g., M.P. 211–212°. Recrystallization of a small portion twice from a mixture of acetone and chloroform gave pure material, M.P. 211.5–212°.

[1] P. S. Pinkney, Org. Synth. Coll., vol. II, 116.

*Analyses.*—Calculated for $C_8H_{10}N_2O$: C, 63.97; H, 6.71; N, 18.66. Found: C, 63.74; H, 6.61; N, 18.71.

EXAMPLE II 6,7-dihydro-4-hydroxy-2-butyl-5H-cyclopenta[d]pyrimidine

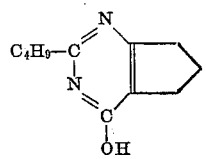

The procedure of Example I is repeated except butyramidine hydrochloride (41.2 g.) is used and 6,7-dihydro-4-hydroxy-2-butyl-5H-cyclopenta[d]pyrimidine is formed.

EXAMPLE III 4-chloro-6,7-dihydro-2-methyl-5H-cyclopenta[d]pyrimidine

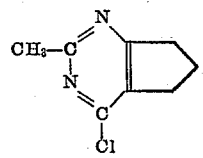

Twenty-five grams of the product of Example I was refluxed for 1.5 hours with 100 ml. of phosphorus oxychloride. The excess of oxychloride was removed in vacuo leaving a thick red oily residue from which a white solid sublimed. As soon as the sublimation became appreciable, the mixture was treated with 70 ml. of chloroform. This solution was cooled to 0° and about 50 ml. of water added dropwise (exothermic). About 70 ml. of concentrated ammonium hydroxide was next added to the well stirred mixture keeping the temperature below 40°. Toward the end of the basification, some inorganic salts separated. These were removed by filtration and discarded. The aqueous phase was separated from the chloroform solution and extracted with 100 ml. of chloroform in two portions. The chloroform layers were combined, washed with 100 ml. of water and dried. Removal of chloroform left 28.4 g. of yellow-red oily residue, which was subjected to vacuum distillation. The bulk of the liquid, 22.7 g. (81%), distilled in the range 108–112° (6.5 mm.). This material was pale yellow in color and had a powerful odor of popcorn. Redistillation of a small center cut for analytical purposes gave 4-chloro-6,7-dihydro-2-methyl-5H-cyclopenta[d]pyrimidine as a clear, colorless liquid B.P. 98° (4 mm.).

*Analyses.*—Calculated for $C_8H_9N_2Cl$: C, 56.99; H, 5.38; N, 16.62; Cl, 21.03. Found: C, 57.19; H, 5.82; N, 16.28; Cl, 20.83.

EXAMPLE IV 4-amino-6,7-dihydro-2-methyl-5H-cyclopenta[d]pyrimidine

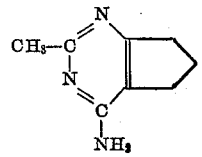

A mixture of 19.3 g. of the product of Example III, 25 ml. of dioxane and 300 ml. of concentrated aqueous ammonia was charged to a stirred autoclave and heated at 100–105° for 16 hours. The resulting product of 14.6 g. (86%), M.P. 250–255°, was crystallized from the aqueous solution on cooling. The brown colored crude solid was dissolved in 150 ml. of 3 molar hydrochloric acid, decolorized with carbon and precipitated by addition of excess sodium hydroxide. About 13.5 g. of a white powder was obtained. Recrystallization of a small amount of this material twice from ethanol gave pure 4-amino-6,7-dihydro-2-methyl-5H-cyclopenta[d]pyrimidine as colorless needles, M.P. 252–253°.

*Analyses.*—Calculated for $C_8H_{11}N_3$: C, 64.40; H, 7.43; N, 28.16. Found: C, 64.58; H, 7.64; N, 28.35.

EXAMPLE V

6,7-dihydro-4-hydroxy-5H-cyclopenta[d]pyrimidine-2-valeronitrile

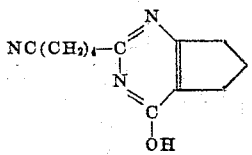

Adiponitrile (108 g.) was converted to its half iminoester hydrochloride with 35.6 g. of dry hydrogen chloride and 40 ml. of methanol according to the procedure of Hoga and Sawai.[2] The crude iminoester hydrochloride (175 g.) was treated at room temperature with a solution of 350 ml. absolute ethanol containing 35 g. of anhydrous ammonia for 24 hours. The reaction mixture was filtered to remove a small amount of ammonium chloride. The filtrate was then concentrated in vacuo until all of the ethanol had been removed. A viscous red oil remained which consisted essentially of a mixture of 5-cyanovaleramidine and its hydrochloride.

Approximately 40 g. of this crude oily amidine mixture was mixed with 80 ml. of tert.-butyl alcohol and 50 g. of 2-carbethoxy-cyclopentanone. To this was added 400 ml. of 0.95 molar potassium tert.-butoxide solution and the reaction run as previously described for the preparation of 6,7-dihydro-4-hydroxy-2-methyl-5H-cyclopenta[d]pyrimidine (Example I).

The crude oily product was washed with ether and dried. The yield was 30.4 g. of white needles, M.P. 141–146°. One recrystallization from ethyl acetate gave 21.2 g. of long needles, M.P. 151–152°. The material was insoluble in ether but very soluble in benzene or alcohol. One additional recrystallization from ethyl acetate gave the analytical sample, M.P. 151–152°.

*Analyses.*—Calculated for $C_{12}H_{15}N_3O$: C, 66.32; H, 6.91; N, 19.34. Found: C, 66.43; H, 7.32; N, 19.56.

EXAMPLE VI

4 - chloro - 6,7 - dihydro-5H-cyclopenta[d]pyrimidine-2-valeronitrile

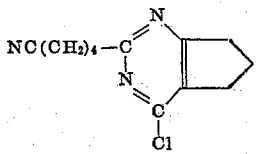

Forty grams of the product of Example V was treated with 150 ml. of phosphorus oxychloride as described for the preparation of 4-chloro-6,7-dihydro-2-methyl-5H-cyclopenta[d]pyrimidine. The resulting crude oily 4-chloro - 6,7 - dihydro - 5H - cyclopenta[d]pyrimidine-2-valeronitrile when subjected to vacuum distillation gave 36.5 g. (84%) of colorless oil, B.P. 211–215° (8 mm.). A center cut taken for analytical purposes was redistilled, B.P. 212–213° (8 mm.).

*Analyses.*—Calculated for $C_{12}H_{14}N_3Cl$: C, 61.14; H, 5.99; N, 17.83; Cl, 15.04. Found: C, 61.10; H, 6.18; N, 18.06; Cl, 15.34.

[2] T. Hoga and M. Sawai, Japan 8678 (1954); C.A. 50, 15578 (1956).

EXAMPLE VII

2 - amino-2(2-cyano-1-pentene-1-ylamino) cyclopentenecarbonitrile

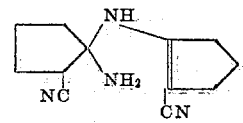

Adiponitrile (216 g.) in 450 ml. of tert.-butyl alcohol was treated with 22 ml. of 0.9 molar potassium tert.-butoxide solution and refluxed for 8 hours under nitrogen. On cooling a copious precipitate of light tan crystals separated. These were collected by filtration, washed with a little ether, and when dry amounted to 148.7 g., M.P. 126–130°. The filtrate containing the mother liquor and ether washings was treated with 600 ml. of water. This solution was extracted with 500 ml. of chloroform in two portions and then discarded. The chloroform layers were combined, washed once with 200 ml. of water and dried. Removal of the bulk of chloroform gave a second crop of crystals, 16.4 g., M.P. 120–130°. A third crop (6.2 g.) of sticky crystals was obtained on complete removal of chloroform. The residual oil amounted to 35 g. which appeared to be about 70% adiponitrile and 30% 2-amino-1-cyclopentene-1-carbonitrile as evidenced by the infrared spectrum. Recrystallization of the small third crop material from methanol gave 3.5 g., M.P. 143–147°, of impure 2-amino-1-cyclopentene-1-carbonitrile.

The large first crop and smaller second crop were combined, decolorized and recrystallized from about 800 ml. of benzene. Approximately 145 g., M.P. 129–130°, of essentially pure 2 - amino - 2(2 - cyano-1-penten-1-ylamino) cyclopentenecarbonitrile was obtained. The analytical sample was prepared by recrystallizing a small amount of this material twice from benzene, M.P. 129.5–130.5°.

*Analyses.*—Calculated for $C_{12}H_{16}N_4$: C, 66.63; H, 7.46; N, 25.90; M.W., 216. Found: C, 66.69; H, 7.47; N, 26.14; M.W., 211 (ebulliscopy in ethylene dibromide).

EXAMPLE VIII

4 - amino - 6,7 - dihydro-5H-cyclopenta[d]pyrimidine-2-valeronitrile

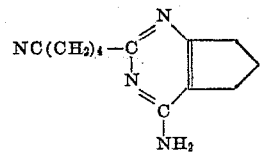

A 250 ml. separatory funnel was charged with 17.3 g. of the product of Example VI, 80 ml. of ice water, and 16 ml. of concentrated hydrochloric acid. The mixture was shaken (10 minutes) until all of the solid had dissolved. The cold aqueous solution was extracted with 150 ml. of chloroform in three portions. The chloroform extracts were combined, washed with 20 ml. of water, and dried. The aqueous phases were combined and while stirred rapidly, basified by dropwise addition of a substantial excess of 50% aqueous sodium hydroxide solution. Excellent quality 4-amino-6,7-dihydro-5H-cyclopenta[d]pyrimidine - 2 - valeronitrile crystallized from the aqueous solution during the basification. The yield of 4 - amino-6,7-dihydro-5H-cyclopenta[d]pyrimidine-2-valeronitrile was 11.4 g. (66%) M.P. 137–139°. Recrystallization from water and finally from a chloroform-benzene mixture gave the analytical sample, M.P. 140.5–141.5°.

*Analyses.*—Calculated for $C_{12}H_{16}N_4$: C, 66.63; H, 7.46; N, 25.90; M.W., 21.6. Found: C, 66.82; H, 7.60; N, 25.96; M.W., 255 (cryoscopy in dioxane).

EXAMPLE IX

*4-acetamido-6,7-dihydro-5H-cyclopenta[d]pyrimidine-2-valeronitrile*

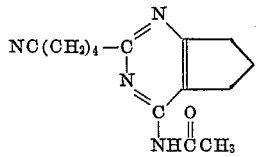

A solution of the product of Example VII in 15 ml. of pyridine and 3.0 g. of acetic anhydride was heated at reflux for 16 hours. The cooled reaction mixture was poured onto cracked ice and dilute hydrochloric acid. This brown solution was extracted with 150 ml. of chloroform in three portions. The chloroform extracts were combined, washed with water, and the solvent removed. The dark oily residue (2.5 g.) was taken up in ether and chromatographed on alumina. A total yield of 1.4 g. (39%) of excellent white needles, M.P. 120–123°, was obtained from the chromatogram. Recrystallization of this material twice from acetone and ether gave the analytical sample, M.P. 122–123°.

*Analyses.*—Calculated for $C_{14}C_{18}N_4O$: C, 65.10; H, 7.02; N, 21.69. Found: C, 65.29; H, 7.32; N, 21.70.

EXAMPLE X

*N-(2-cyano-1-cyclopenten-1-yl) acetamide*

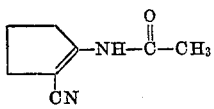

A dispersion containing 23 g. of sodium in 600 ml. of toluene at 60–70° was treated dropwise with 87 g. of tert.-butyl alcohol with good stirring. When evolution of hydrogen had ceased the thick suspension was heated at reflux for 10 minutes. Adiponitrile (108 g.), was then added dropwise with good stirring over about a 1 hour period. The reaction was quite exothermic during the early stages but slackened as more solid separated. Refluxing was continued for 1 hour after all of the adiponitrile had been added.

The heavy mixture was allowed to cool and stand overnight at room temperature. Workup was effected by addition of about 400 ml. of water (exothermic). Considerable organic solid separating at this point was removed by filtration. The toluene phase was washed with another 200 ml. of water and more crystals separated. After these were collected, the aqueous phases were extracted once with 200 ml. of chloroform and discarded. The toluene and chloroform phases were combined, washed with a little water and stripped to dryness, leaving a small crop (7.1 g.) of crude product. The various crops of crude crystals were allowed to air dry and then were combined and recrystallized from about 500 ml. of chloroform. In all, 92.3 g. (85%) M.P. 147–148°, 2-amino-1-cyclopentene-1-carbonitrile as pale yellow needles was obtained.

A solution of 5.4 g. of 2-amino-1-cyclopentene-1-carbonitrile, 25 ml. of dry pyridine and 10.2 g. of acetic anhydride was heated at 100° for 16 hours under a nitrogen atmosphere. The solution was cooled and poured into a mixture of ice (about 80 g.) and 100 ml. of 6 molar hydrochloric acid. On scratching, a crop of brown colored crystals separated which, when dried, amounted to 3.0 g., M.P. 115–125°. Extraction of the aqueous mother liquor with 100 ml. of chloroform in two portions followed by washing, drying and removal of solvent gave a brown oily residue from which an additional crop of impure acetate (2.5 g.), M.P. 112–120°, was obtained on trituration with ether. The crude crystalline fractions of N-(2-cyano-1-cyclopenten-1-yl) acetamide were combined, dissolved in a benzene-ether mixture and chromatographed on alumina. In all, about 3.8 g. (54%) of good quality N-(2-cyano-1-cyclopenten 1-yl) acetamide, M.P. 123–125° was obtained. Recrystallization of a portion twice from ether and benzene gave the analytical sample, M.P. 124–125°.

*Analyses.*—Calculated for $C_8H_{10}N_2O$: C, 63.97; H, 6.71; N, 18.66. Found: C, 63.95; H, 6.75; N, 18.51.

EXAMPLE XI

*N-(2-cyano-1-cyclopenten-1-yl) benzamide*

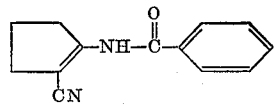

To a cold (10° C.) mixture of 5 ml. of pyridine and 1.08 g. of 2-amino-1-cyclopentene-1-carbonitrile, as prepared in Example IX above, was added 1.4 g. of benzoyl chloride dissolved in 3 ml. of dioxane. The reaction was allowed to stand at 5° for 0.5 hr. and then poured into about 50 ml. of cracked ice and dilute hydrochloric acid. The yellow oil which separated was taken up in chloroform, washed with water and dried. Removal of chloroform gave 1.7 g. oil which when triturated with ether and allowed to stand overnight at −5° deposited 800 mg. of light tan crystals, M.P. 92–95°. They were dissolved in ether and the solution put through a short column of alumina. Removal of solvent gave 636 mg. of pure N-(2-cyano-1-cyclopenten-1-yl) benzamide, M.P. 96–97°. Recrystallization once from ether did not change the melting point.

*Analyses.*—Calculated for $C_{13}H_{12}N_2O$: C, 73.57; H, 5.70; N, 13.20. Found: C, 73.69; H, 5.72; N, 12.85.

The compounds of this invention has been found to be useful as herbicides. For example, 4-chloro-6,7-dihydro-2-methyl-5H-cyclopenta[d]pyrimidine when applied in the amount of 25 lbs. per acre in a pre-emergence test application on selected plants produced the following results:

| Plant | Phytotoxic Effect |
|---|---|
| Radish-mustard | Severe. |
| Sugar beet | Do. |
| Barnyard grass | Moderate. |
| Crab grass | Do. |
| Field bindweed | Do. |

While this invention has been described with respect to certain embodiments it is not so limited, and it is to be understood that variations and modifications thereof obvious to those skilled in the art may be made without departing from the spirit or scope of this invention.

What is claimed is:
1. 4 - chloro-6,7-dihydro-2-methyl - 5H - cyclopenta[d]pyrimidine.
2. 4 - amino-6,7-dihydro-2-methyl - 5H - cyclopenta[d]pyrimidine.
3. 6,7-dihydro-4-hydroxy - 5H - cyclopenta[d]pyrimidine-2-valeronitrile.
4. 4 - chloro-6,7-dihydro - 5H - cyclopenta[d]pyrimidine-2-valeronitrile.
5. 4-acetimido-6,7-dihydro - 5H - cyclopenta[d]pyrimidine-2-valeronitrile.

References Cited in the file of this patent

McCasland et al.: J. Amer. Chem. Soc., vol. 74 (1952), pp. 842–843.

Haga: Chemical Abstracts, vol. 49 (1955), column 14815e (abstract of Japanese Patent 2188, April 23, 1954).